UNITED STATES PATENT OFFICE.

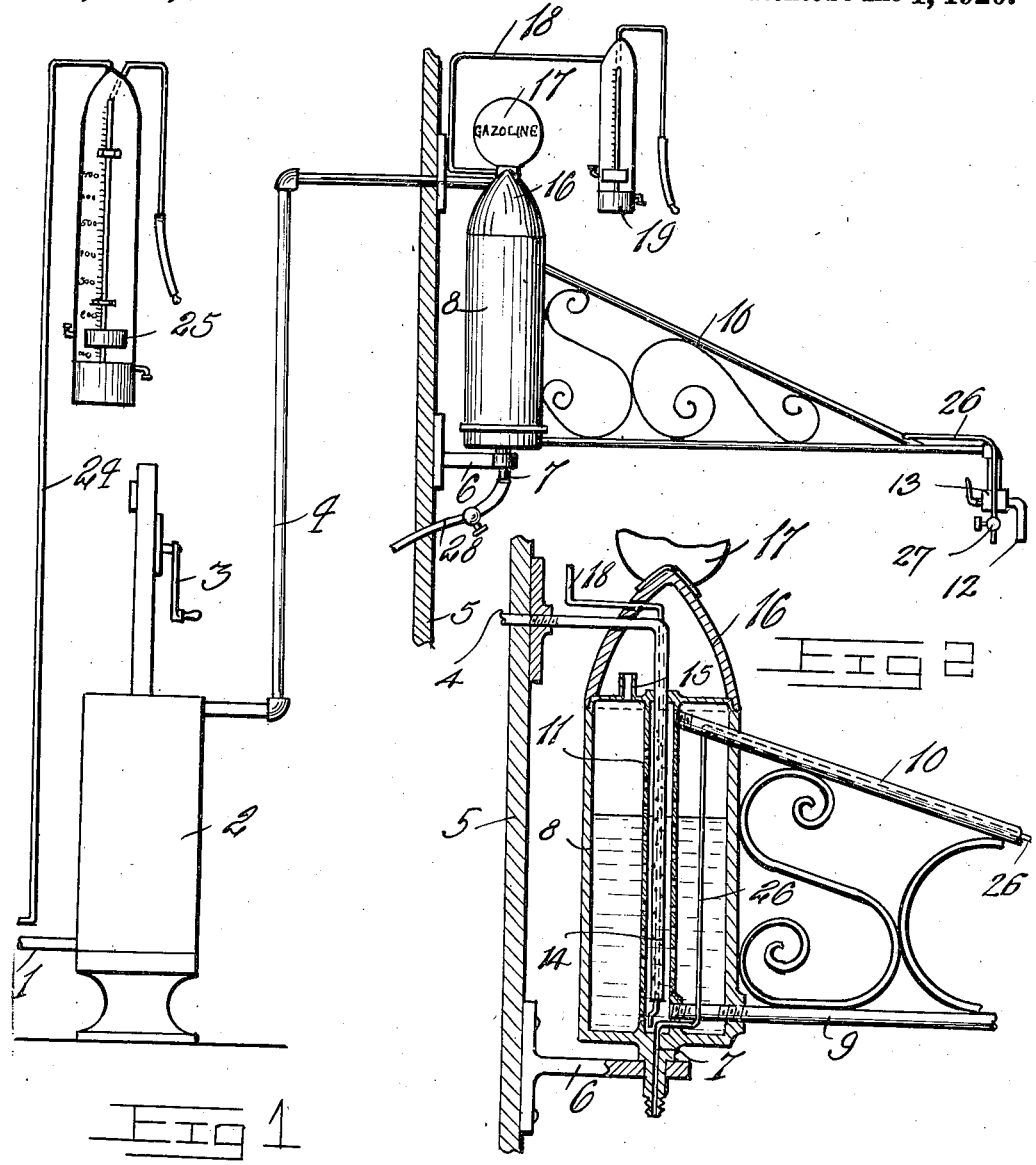

SIMÉON GAGNON, OF MONTREAL, QUEBEC, CANADA, ASSIGNOR OF ONE-HALF TO ALFRED PILON, OF MONTREAL, QUEBEC, CANADA.

DISPENSER.

1,341,711.   Specification of Letters Patent.   Patented June 1, 1920.

Application filed August 17, 1918. Serial No. 250,317.

*To all whom it may concern:*

Be it known that I, SIMÉON GAGNON, a subject of the King of Great Britain, residing at Montreal, Province of Quebec, Canada, have invented certain new and useful Improvements in Dispensers; and I do hereby declare that the following is a full, clear, and exact description of the invention, such as will enable others skilled in the art to which it appertains to make and use the same.

The present invention relates to dispensers for gasolene supplying systems.

It is not always convenient for a dealer to install a pump for supplying and measuring gasolene in front of his store or in view of a consumer, such as an automobile owner who desires to stay near his supply tank. The object of the present invention is to provide a dispensing apparatus which is to be used in connection with the ordinary measuring and supplying pump, whereby the measuring and supplying pump may be hidden from view and the present apparatus arranged exteriorly of the building or in view of the consumer, whereby the latter may have easy and ready access to the gasolene supply pipe and at the same time readily ascertain the amount of gasolene he is being supplied with.

With the above and other objects in view which will hereinafter appear as the description continues, the invention consists of the novel features of construction, combination and formation of parts as will be hereinafter more fully described and particularly pointed out in the appended claims.

In the accompanying drawings has been shown a simple and preferred form of the invention, it being, however, understood that no limitation is necessarily made to the precise structural details herein exhibited, but the right is hereby reserved to any changes, alterations or modifications to which recourse may be had that come within the scope of the claims without departing from the spirit of the invention or sacrificing the efficiency of the same.

In the accompanying drawings:

Figure 1 is a diagrammatical view of the system embodying the present invention;

Fig. 2 is a vertical section through the auxiliary tank and support therefor.

Referring now more particularly to the accompanying drawings wherein like and corresponding parts are designated by similar reference characters throughout the several views.

In the ordinary gasolene supplying and measuring apparatuses the dealer stores the gasolene in a suitable tank and communicating with this tank or reservoir is a pipe 1 which leads to a measuring pump 2 which is preferably a pump known as a Bowser pump. By turning the crank 3 the gasolene is drawn from the reservoir in the desired quantities and is fed to an outlet pipe 4. In this way the consumers may be supplied with the desired amount of gasolene and the latter is properly measured out. These measuring devices are not always in view, and as the consumer generally desires to see the amount of gasolene he is getting, the purpose of the present invention is to provide an auxiliary dispenser whereby the consumer may readily see the amount of gasolene he is being supplied with. These measuring devices are sometimes installed within a building and therefore the consumer who is exteriorly of the building cannot see the amount of gasolene that is being fed to the tank of his automobile or the like. The numeral 5 indicates a building wall and supported upon the outer face of this building wall is a bearing 6 in which is rotatably mounted a journal 7 carrying an auxiliary tank 8. Formed with and extending through this tank 8 is a vertical reinforcing rod or pipe 11 which is perforated so as to permit the gasolene to circulate freely within the tank 8, and extending through this tank and connected to this support 11 are the hollow rods or pipes 9 and 10 respectively which are suitably connected together and form a supporting bracket. The outer ends of these rods 9 and 10 are connected together as shown and provide an outlet for the gasolene whereby the same may flow from the tank 8 through the pipes 9 and 12 and then into the supply tank of the consumer. A coupling 13 having a valve therein is arranged between the pipes 9 and 12 so that the flow of the gasolene to the consumer's tank may be controlled.

From this it is obvious that the tank 8 may swing upon its support, thereby permitting the supply pipe connected thereto to swing at various angles when feeding the gasolene to the consumer's supply tank. The pipe 4 extends through the building wall and terminates in a depending perforated pipe 14 which extends down within the pipe 11 of the tank 8. The top of this tank 8 has a vent pipe or opening 15 arranged therein. Seated upon the top of the tank is a cap 16 and the pipes 4 and 18 extend through this cap down within the tank 8, and as these pipes 4 and 18 are rigid the cap 18 is held stationary, but the tank 8 may swing between this cap 16 and its supporting bracket 6. The openings formed within this cap 16 through which the pipes 4 and 18 pass are of sufficient diameter so that the atmospheric air may pass through these openings to gain access into the tank 8 through the vent pipe 15. In disassembling the tank the pipes 4 and 18 may be disconnected and the cap 16 readily removed from the tank. The pipe 18 leads to a suitable indicator 19 which is arranged exteriorly of the building so that the consumer may readily ascertain the amount of gasolene that has passed into the tank 8. The dealer's reservoir may also have connected thereto a pipe 24 which leads to an indicator 25 and this latter being of the same construction as the indicator 19, so that the dealer may at all times ascertain the amount of gasolene stored within his supply tank.

From the foregoing it is obvious that when a dealer has a measuring device installed within a building and not in view by the consumer, this auxiliary indicating and supplying system may be installed exteriorly of the building and the consumer may stay adjacent his receiving tank and readily tell the amount of gasolene he is being supplied with.

When it is desired a pipe 26 may extend through the tank 8 having one end connected to a pipe 28, which latter pipe is in communication with an air supply tank. The opposite end of this pipe 26 extends through the pipe 10 and terminates in a valve controlled end 27 and a suitable piping may be connected to this valve controlled end 27 of the air supply pipe by an owner of an automobile who may have within his reach an air pipe for inflating his tires.

Having thus fully described my invention, what I claim as new and desire to secure by Letters Patent is:

1. In a device of the character described including an auxiliary tank, a supply pipe leading to said tank, means for pivotally supporting said tank, a bracket carried by said tank, a discharge pipe carried by said bracket and communicating with said tank, an air supply pipe leading through said tank, said air supply pipe being supported upon said bracket substantially as and for the purpose specified.

2. The combination with a gasolene measuring apparatus, of an auxiliary tank, of a supply pipe establishing a means of communication between said apparatus and said tank, means for pivotally supporting said tank, a perforated pipe formed with said tank, a bracket comprising a pair of hollow pipes extending through said tank and connected to said perforated pipe, an outlet pipe communicating with said bracket, a stationary cap mounted upon said tank, said supply pipe extending through said cap and down within said perforated pipe, and an indicator communicating with said tank substantially as and for the purpose specified.

In witness whereof I have hereunto set my hand.

SIMÉON GAGNON.